United States Patent
Chaudhuri et al.

(10) Patent No.: US 9,563,401 B2
(45) Date of Patent: Feb. 7, 2017

(54) EXTENSIBLE ITERATIVE MULTIPLIER

(71) Applicant: Wave Semiconductor, Inc., Sunnyvale, CA (US)

(72) Inventors: Samit Chaudhuri, Cupertino, CA (US); Radoslav Danilak, Cupertino, CA (US)

(73) Assignee: Wave Computing, Inc., Campbell, CA (US)

( * ) Notice: Subject to any disclaimer, the term of this patent is extended or adjusted under 35 U.S.C. 154(b) by 187 days.

(21) Appl. No.: 14/099,949

(22) Filed: Dec. 7, 2013

(65) Prior Publication Data

US 2014/0164457 A1 Jun. 12, 2014

Related U.S. Application Data (60) Provisional application No. 61/734,949, filed on Dec. 7, 2012, provisional application No. 61/740,418, filed on Dec. 20, 2012.

(51) Int. Cl.
*G06F 7/53* (2006.01)
*G06F 7/533* (2006.01)

(52) U.S. Cl.
CPC ........... *G06F 7/5324* (2013.01); *G06F 7/5338* (2013.01)

(58) Field of Classification Search
None
See application file for complete search history.

(56) References Cited

U.S. PATENT DOCUMENTS

| | | | | |
|---|---|---|---|---|
| 5,042,001 A | * | 8/1991 | Brightman | G06F 7/544 708/490 |
| 5,220,525 A | * | 6/1993 | Anderson | G06F 7/5338 708/631 |
| 5,422,805 A | * | 6/1995 | McIntyre | G06F 7/5443 708/525 |
| 5,528,529 A | * | 6/1996 | Seal | G06F 7/5443 708/628 |
| 6,301,600 B1 | | 10/2001 | Petro et al. | |
| 7,346,644 B1 | * | 3/2008 | Langhammer | H03K 19/17732 326/38 |
| 7,730,118 B2 | | 6/2010 | Kurd | |
| 8,224,883 B2 | | 7/2012 | Pedersen et al. | |
| 8,229,992 B2 | | 7/2012 | Belluomini et al. | |
| 8,244,790 B2 | | 8/2012 | Satoh et al. | |

(Continued)

OTHER PUBLICATIONS

Chou, Christopher H., et al. "VEGAS: soft vector processor with scratchpad memory." Proceedings of the 19th ACM/SIGDA international symposium on Field programmable gate arrays. ACM, 2011.

(Continued)

*Primary Examiner* — Michael D Yaary
(74) *Attorney, Agent, or Firm* — Adams Intellex, PLC (57) ABSTRACT

An extensible iterative multiplier design is provided. Embodiments provide cascaded 8-bit multipliers for simplifying the performance of multi-byte multiplications. Booth encoding is performed in the lowest order multiplier, with the result of the Booth encoding then provided to higher order multipliers. Additionally, multiply-add operations can be performed by initializing a partial product sum register. Configurable connections between the multipliers facilitate a variety of possible multiplication options, including the possibility of varying the width of the operands.

20 Claims, 7 Drawing Sheets

(56) References Cited

U.S. PATENT DOCUMENTS 8,270,558 B2     9/2012   Dielissen
8,291,002 B2    10/2012   Craske

OTHER PUBLICATIONS

Erle, Mark A., Michael J. Schulte, and Brian J. Hickmann. "Decimal floating-point multiplication via carry-save addition." Computer Arithmetic, 2007. ARITH'07. 18th IEEE Symposium on. IEEE, 2007.

Pillmeier, Matthew R., Michael J. Schulte, and Eugene G. Walters III. "Design alternatives for barrel shifters." Proceedings of SPIE—Advanced Signal Processing Algorithms, Architectures, and Implementations XII 4791 (2002): 436-447.

\* cited by examiner

EXTENSIBLE ITERATIVE MULTIPLIER

RELATED APPLICATIONS

This application claims the benefit of U.S. provisional patent application "Extensible Iterative Multiplier" Ser. No. 61/734,949, filed Dec. 7, 2012 as well as "Selectively Combinable Shifters" Ser. No. 61/740,418, filed Dec. 20, 2012. The foregoing applications are each hereby incorporated by reference in their entirety.

FIELD OF ART

This application relates generally to logic circuitry and more particularly to an extensible iterative multiplier.

BACKGROUND

The ability to perform sophisticated vector and scalar arithmetic operations in real time is an important aspect of computer systems. Often, however, this requirement is complicated by severe physical constraints upon the size, weight, power, and cooling of a specific computer system. Inherently, designers must compromise to achieve competing requirements. This compromise between different objectives (a computer's size/power or weight/heat ratios, for example) often results in processors with less than adequate performance. Since mathematical operations such as multiplication are essential in various and varied applications such as communications, cryptography, gaming, and digital video, the performance of a computer system is critical. Also, as mobile computing becomes more prevalent, issues such as circuit size and power consumption take on an even greater importance.

Multiplication algorithms vary, depending on the number system used. Numbers may be represented in many different ways. The simplest number systems may be unary numeral systems—such as tally marks—where the number of symbols represents the number. Sign-value notation systems, such as the Roman numeral system, use different symbols to represent different numbers; the value for each symbol is added, subtracted, or both, to determine the number represented. Positional systems, otherwise known as place-value notation, are more commonly used today.

Positional systems are based on a radix, or base, that is used to determine a value of a particular placement of a symbol. The numerical value of a position may be the radix taken to a power that is dependent on its position, or digit. Positional systems may include a radix point—the symbol "." is commonly used in the United States—placed immediately to the right of the zeroth position, the position having the value of (radix) 0 or one. Typically, if no radix point is included, the rightmost symbol is assumed to be the zeroth position. The value of a position can be determined by counting the number of positions to the left of the zeroth position and taking the radix to that power. The number represented can then be determined by multiplying the value of the symbol and the value of the symbol's position, and then summing the products of each digit, or position.

Any number can be used as the base, or radix, for a system of numerical representation, although typically positive integers are used. For example, though the most common number system in use today, which is usually referred to as the Arabic or Hindu-Arabic number system, has a base of 10 and uses the commonly known symbols of "0123456789," some ancient cultures such as the Babylonians and Sumerians used number systems with base 60 or base 12. Even today, digital computer systems commonly use a binary system with a base of 2 and computer scientists often use octal (base 8) or hexadecimal (base 16) number systems to re-encode numbers represented in binary into a more human-friendly form.

SUMMARY

Multiplication is a critical operation for many of today's mobile computing applications such as digital telephony, video decoding, data encryption, video games, e-commerce, and the like. Embodiments of the present concepts provide an extensible iterative multiplier apparatus which scales linearly rather than exponentially. Hence, embodiments provide solutions with reduced hardware costs compared with the conventional parallel approach. This reduces the cost and power consumption disadvantages inherent in the parallel scheme while providing for efficient multiplication of multi-byte numbers. An apparatus for mathematical manipulation is disclosed comprising: a first multiplier which can multiply two binary numbers of a first width; a second multiplier which can multiply two binary numbers of a second width; and a connection between the first multiplier and the second multiplier that enables multiplication of two binary numbers of a third width where the third width has a width that is a sum of the first width and the second width, wherein the multiplication of the two binary numbers of the third width is accomplished iteratively.

In embodiments, a method of logical calculation comprises: configuring a first multiplier which can multiply two binary numbers of a first width and a second multiplier which can multiply two binary numbers of a second width through a connection between the first multiplier and the second multiplier to enable multiplication of two binary numbers of a third width where the third width has a width that is a sum of the first width and the second width, wherein the multiplication of the two binary numbers of the third width is accomplished iteratively. In some embodiments, a computer implemented-method for implementation of a logical calculation apparatus comprises: implementing a first multiplier which can multiply two binary numbers of a first width; implementing a second multiplier which can multiply two binary numbers of a second width; and implementing a connection between the first multiplier and the second multiplier that enables multiplication of two binary numbers of a third width where the third width has a width that is a sum of the first width and the second width, wherein the multiplication of the two binary numbers of the third width is accomplished iteratively. In embodiments, a computer program product embodied in a non-transitory computer readable medium comprises: code for implementing a first multiplier which can multiply two binary numbers of a first width; code for implementing a second multiplier which can multiply two binary numbers of a second width; and code for implementing a connection between the first multiplier and the second multiplier that enables multiplication of two binary numbers of a third width where the third width has a width that is a sum of the first width and the second width, wherein the multiplication of the two binary numbers of the third width is accomplished iteratively. In some embodiments, a computer system for implementation of a logical calculation apparatus comprises: a memory which stores instructions; one or more processors coupled to the memory wherein the one or more processors are configured to: implement a first multiplier which can multiply two binary numbers of a first width; implement a second multiplier which can multiply two binary numbers of a second width; and implement a connection between the first multiplier and the second multiplier that enables multiplication of two binary numbers of a third width where the third width has a width that is a sum of the first width and the second width, wherein the multiplication of the two binary numbers of the third width is accomplished iteratively.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Multiplication is essential for many of today's computing applications, such as digital video, cryptography, image processing, video games, and the like. The disclosed concepts provide dedicated hardware to support multiplication operands of various widths. In general, multiplication involves multiplying a multiplier by a multiplicand to obtain a product. The product may be obtained by forming multiple partial products and accumulatively adding the partial products. By using extensible multipliers as disclosed, wide numbers can be multiplied with minimal hardware overhead, allowing the extensible multipliers to be reconfigured and used separately or in other combinations. Example basic units shown include an eight-bit multiplier; wider multiplications can be performed by decomposing numbers into smaller eight-bit components. Direct decompositions can be computationally and physically expensive, as the required number of eight-bit multiplications increases exponentially. For example, decomposing a 32-bit multiplication in this manner comprises 16 eight-bit multiplications, a computationally intensive task even before taking into consideration that the resulting partial products must be added using several adders. A parallel approach reduces the computation time but requires an excessive amount of hardware resources (registers, multipliers, adders, etc.).

Embodiments provide an extensible iterative multiplier apparatus which scales linearly, rather than exponentially. For example, for a 32-bit multiplication, only four eight-bit multipliers are needed. Hence, embodiments provide solutions with reduced hardware costs compared with the conventional parallel approach. This reduces the disadvantages inherent in the parallel scheme while also providing for efficient multiplication of multi-byte numbers. Various other multiplier widths, for both basic units and combined multipliers, are clearly possible using the disclosed concepts. For example, basic unit widths of four, six, twelve, sixteen, and other values could be implemented. Therefore multipliers with an eight-bit width are included for example sake and should not be viewed as a limitation.

Figure 1:
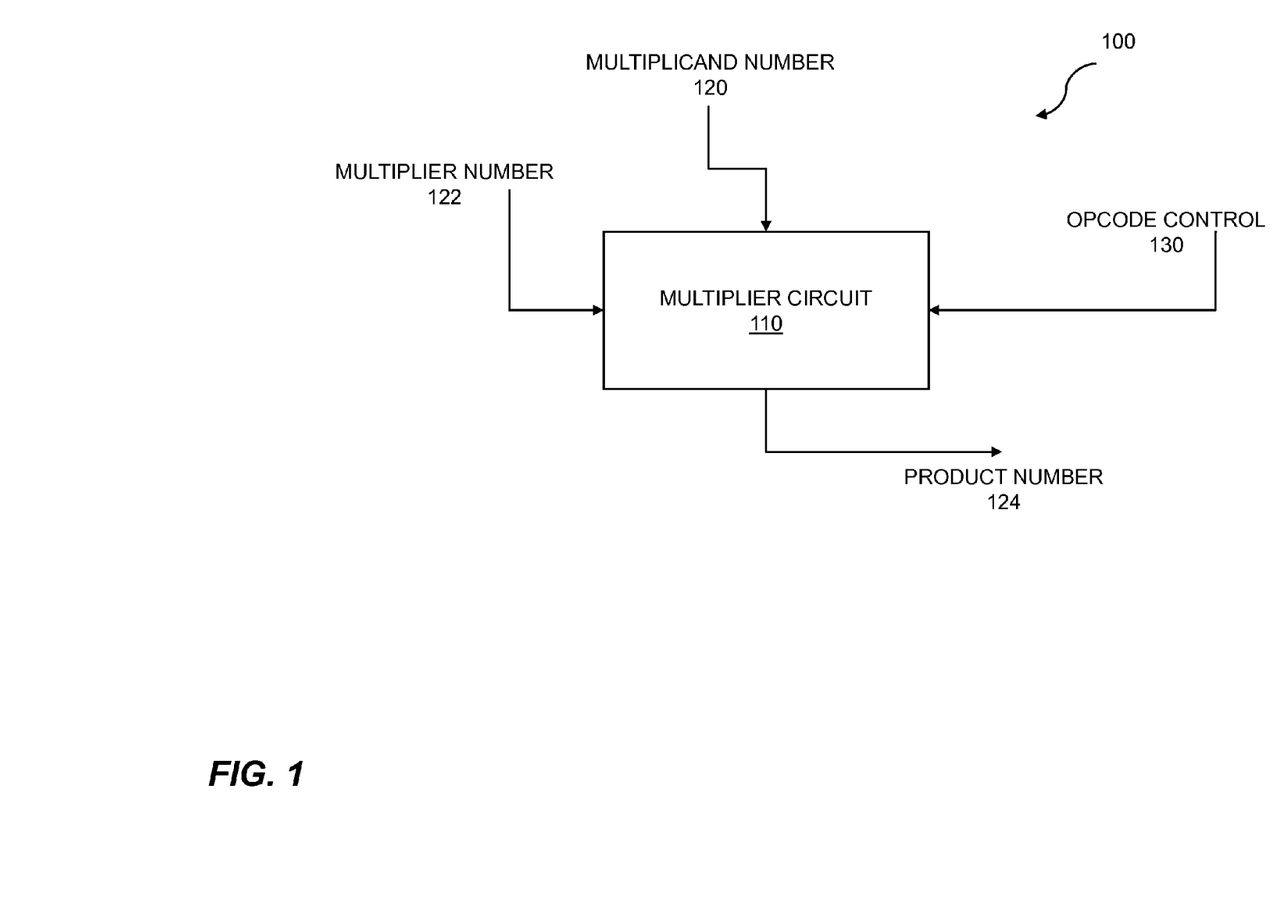
FIG. 1 is a block diagram of a multiplier circuit.

FIG. 1 is a block diagram of a multiplier system 100. The multiplier system 100 comprises an apparatus for mathematical manipulation utilizing a multiplier circuit 110. The multiplier circuit 110 comprises multiple logic gates, data registers, configuration registers, programmable gate arrays, or other suitable hardware elements for implementing the multiplication. A multiplicand number 120 and multiplier number 122 are input to the multiplier circuit 110. In some embodiments, the multiplicand number 120 and the multiplier number 122 are input to the multiplier circuit 110 by storing two binary numbers (multiplier and multiplicand) in one or more data registers. An opcode control 130 provides instructions and/or configuration for the specific type of multiplication to be performed. The type of multiplication may include information encoded in binary specifying the width of the multiplication (e.g. an eight-bit multiplication, a 32-bit multiplication, etc. . . . ), as well as information specifying whether the multiplication is performed on signed or unsigned operands. The multiplication of the two binary numbers, which when taken together represent the multiplication's width, can be accomplished iteratively. The result of such a multiplication is a product number 124. The product number 124 may be stored in a data register within the multiplier circuit 110 for retrieval by other subsystems within a computer system. In some embodiments, the product number 124 is stored in one of the registers used for the multiplier or multiplicand. In other embodiments, the product number 124 is stored in multiple registers. For example, lower-order bits of the product number 124 may be stored in one register, while higher-order bits of the product number 124 may be stored in a different register. The apparatus can include a register for a multiplier number and register for a multiplicand number.

Figure 2:
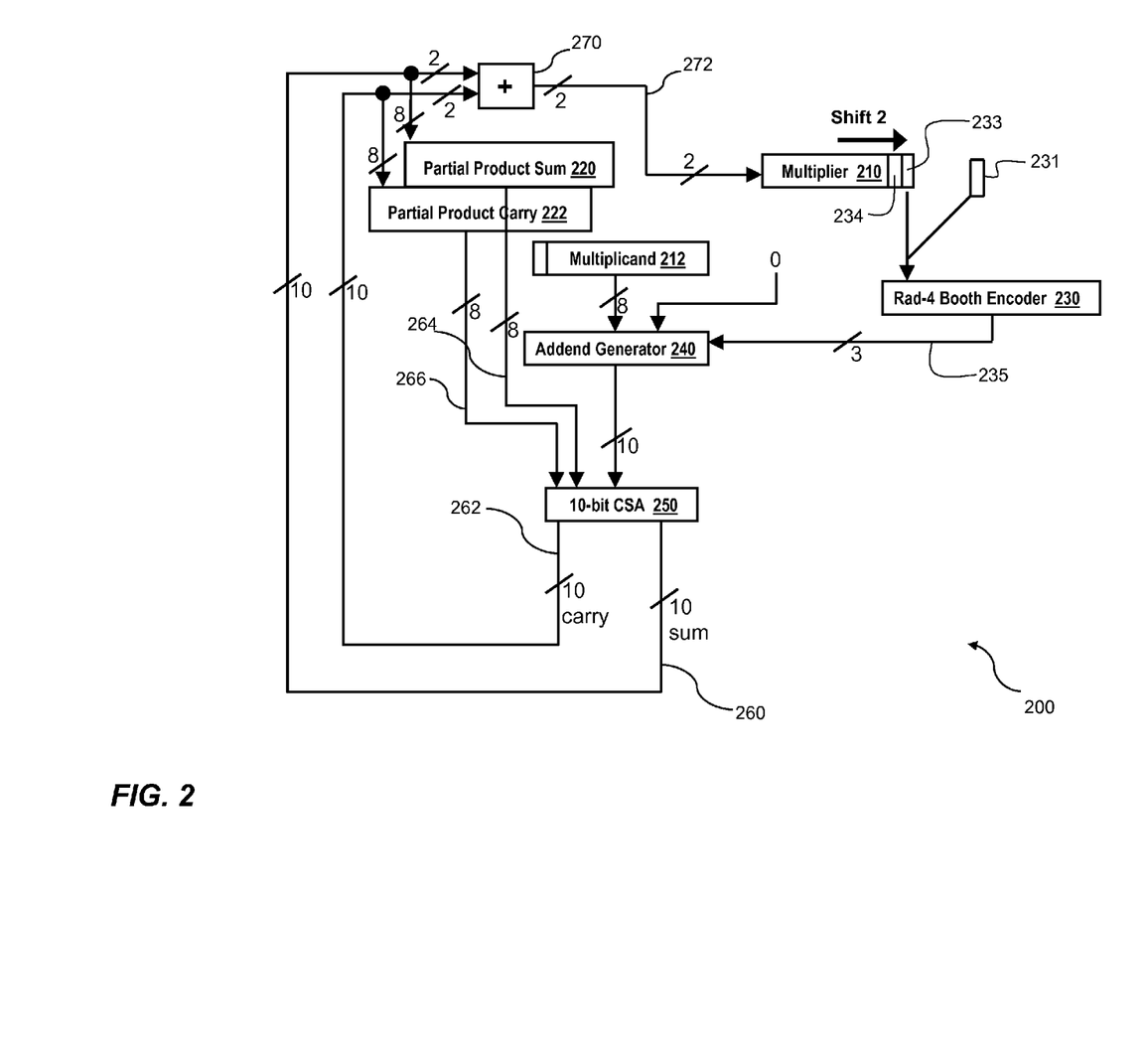
FIG. 2 is a logic diagram of an eight-bit multiplier.

FIG. 2 is a logic diagram of an eight-bit multiplier 200. In embodiments, multiplier 200 comprises a multiplier register 210 and a multiplicand register 212. Initially, the multiplier register 210 and the multiplicand register 212 contain values that are to be multiplied together to obtain a product. The multiplier 200 may provide Booth encoding. The register 210 for the multiplier number may be shifted to produce a Booth encoding. As shown in the diagram 200 a radix-4 Booth encoder module 230 performs a radix-4 Booth multiplication algorithm. An implicit bit 231 below the least significant bit is used by Booth encoder module 230. Initially, the implicit bit 231 is set to logical 0. The multiplication operation is initiated by right-shifting the multiplier 210 into low order bits 233 and 234. The state of the two low order bits, bit 233 and bit 234, along with the implicit bit 231, determine the operation that occurs in the addend generator 240. The Booth encoder module 230 configures the addend generator via a control signal 235. The output of the addend generator 240 is input to a 10-bit carry save adder (CSA) 250. Hence, a 10-bit addend may be generated and a carry-save addition may be performed with a stored partial product. In general, the carry save adder 250 may have a width value equal to the multiplier's width plus two. The multiplier may include configuration logic comprising a partial product register (a sum and/or a carry register). In the diagram, the dual outputs of CSA 250 are a 10-bit sum signal 260 and a 10-bit carry signal 262. The lower two bits of sum signal 260 and carry signal 262 are input to a 2-bit adder 270. Eight upper bits from the multiplication may be stored in carry-save form. The upper eight bits of sum signal 260 are input to a partial product sum (PPS) register 220. The upper eight bits of carry signal 262 are input to a partial product carry (PPC) register 222. A partial product sum signal 264 provides the eight bits of the PPS register 220 as an input to the CSA 250. Similarly, a partial product carry signal 266 provides the eight bits of the PPC register 222 as an input to the CSA 250.

In the diagram, the output 272 of the 2-bit adder 270 is shifted into the upper bits of the multiplier register 210. The multiplication may be performed iteratively. With each iteration of the multiplier 200, the multiplier register is shifted right by two bits and a Booth encoding is produced by Booth encoder module 230, thus generating a 10-bit addend in the addend generator 240. When the Booth encoder module 230 completes the radix-4 Booth multiplication algorithm after four iterations, the multiplier register 210 contains the low eight bits of the product, while the upper eight bits of the product are represented in the PPS register 220 and the PPC register 222. Hence, the multiplication by the multiplier 200 may be by iteration wherein the iteration includes four steps to accomplish eight-bit multiplication.

Figure 3:
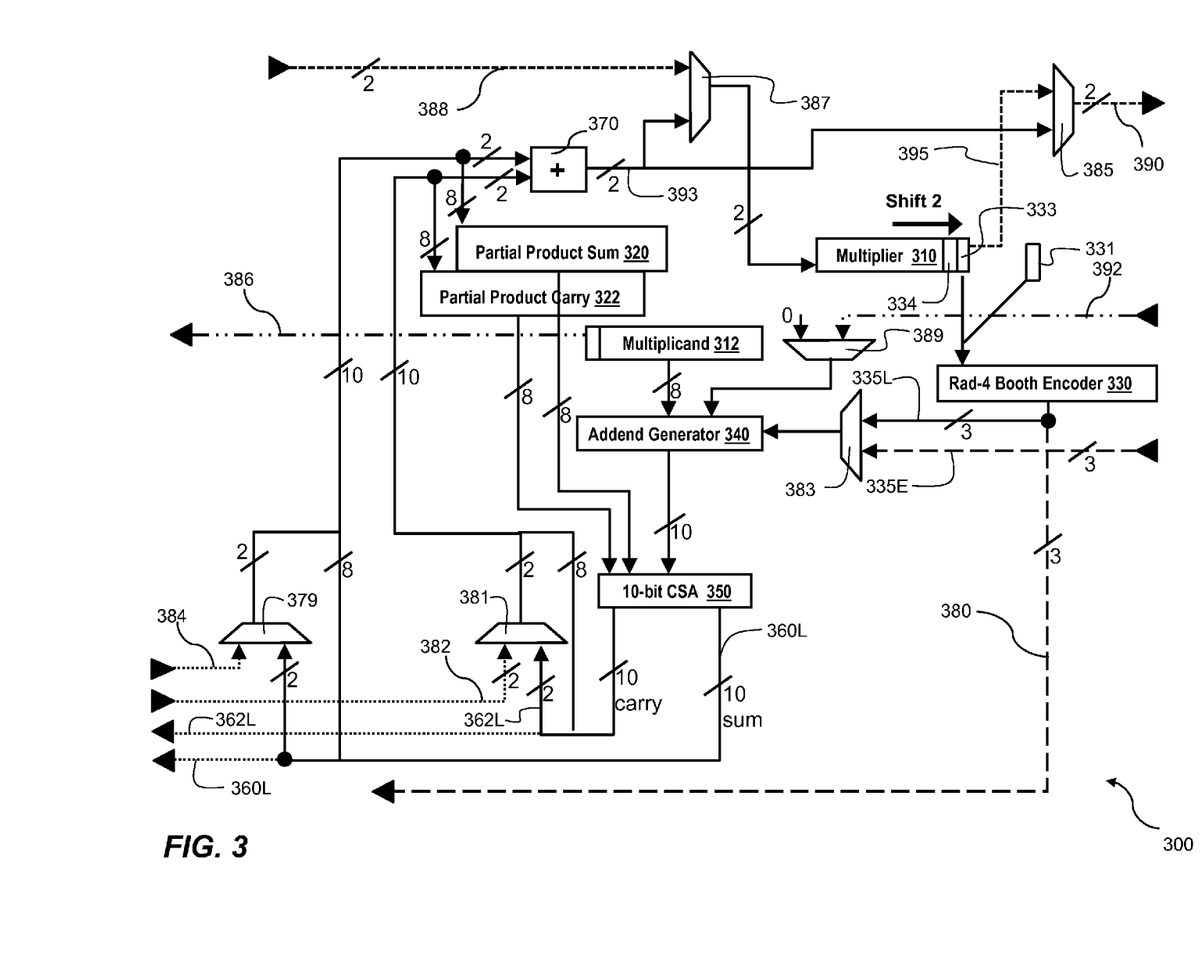
FIG. 3 is a logic diagram of an extensible eight-bit multiplier.

FIG. 3 is a logic diagram of an extensible eight-bit multiplier 300. The multiplier 300 is similar to the previously shown multiplier 200, with the addition of various control lines and multiplexers to facilitate an extensible mode of operation. In this example, when multiple multipliers similar to the multiplier 300 shown are cascaded together, only the least significant multiplier performs Booth encoding. The remaining multipliers receive inputs from, and provide outputs to, other multipliers. The multiplier 300 comprises multiplexers 379, 381, 383, 385, 387, and 389. These multiplexers allow a selected input (one of the multiplexer's two inputs) to be sent to the multiplexer's output. A control signal (not shown) on each multiplexer may be asserted or de-asserted to select a given input. One multiplexer 383 is a Booth encoder selection multiplexer. In local mode (which is used when a multiplier is standalone or the least significant multiplier in a cascaded configuration), the multiplexer 383 selects a local Booth encoding configuration signal 335L, which is also output as a Booth encoding output configuration signal 380 for use by other multipliers.

When the multiplier 300 is in extensible mode, the multiplexer 383 selects an external Booth encoding configuration signal 335E, and the Booth encoder 330 is not used. One multiplexer 389 is the addend initialization multiplexer. When the multiplier 300 is configured in local mode, the multiplexer 389 initializes the addend generator 340 with 0. When the multiplier 300 is configured in extensible mode, the multiplexer 389 initializes the addend generator with an external addend generator initialization signal 392. One multiplexer 381 is the CSA carry selection multiplexer. When the multiplier 300 is configured in local mode, the multiplexer 381 provides the upper two bits of a local CSA carry signal 362L from a carry save adder 350 to an input of a two bit adder 370. When the multiplier 300 is configured in extensible mode, the multiplexer 381 provides the upper two bits of an external CSA carry signal 382 (provided by another instance of a multiplexer unit 300) to an input of the two bit adder 370. One multiplexer 379 is the CSA sum selection multiplexer. When the multiplier 300 is configured in local mode, the multiplexer 379 provides the upper two bits of a local CSA sum signal 360L to an input of the two bit adder 370. When the multiplier 300 is configured in extensible mode, the multiplexer 379 provides the upper two bits of an external CSA sum signal 384 (provided by another instance of a multiplexer unit 300) to an input of the two bit adder 370. Still another multiplexer 387 is a multiplier-register, high-order, bit-input selection multiplexer. When the multiplier 300 is configured in local mode, the multiplexer 387 provides the output 393 of the local two bit adder 370 shifted into the high order bits of a multiplier register 310. When the multiplier 300 is configured in extensible mode, the multiplexer 387 provides an external adder output signal 388 (from the two bit adder of another multiplier 300) shifted into the high order bits of the multiplier register 310. Another multiplexer 385 is the multiplier-lower, order-bits multiplexer. When the multiplier 300 is configured in local mode, the output 393 of a local two-bit adder 370 is output to a signal 390. When the multiplier 300 is configured in extensible mode, the lower order bits (a bit 333 and a bit 334) from the multiplier 310 are sent via the output 395 to the signal 390. The high order bit of a multiplicand register 312 is output via a signal 386 and is available to other multipliers when configured for multi-byte multiplication (e.g. 32 bit multiplication).

Figure 4:
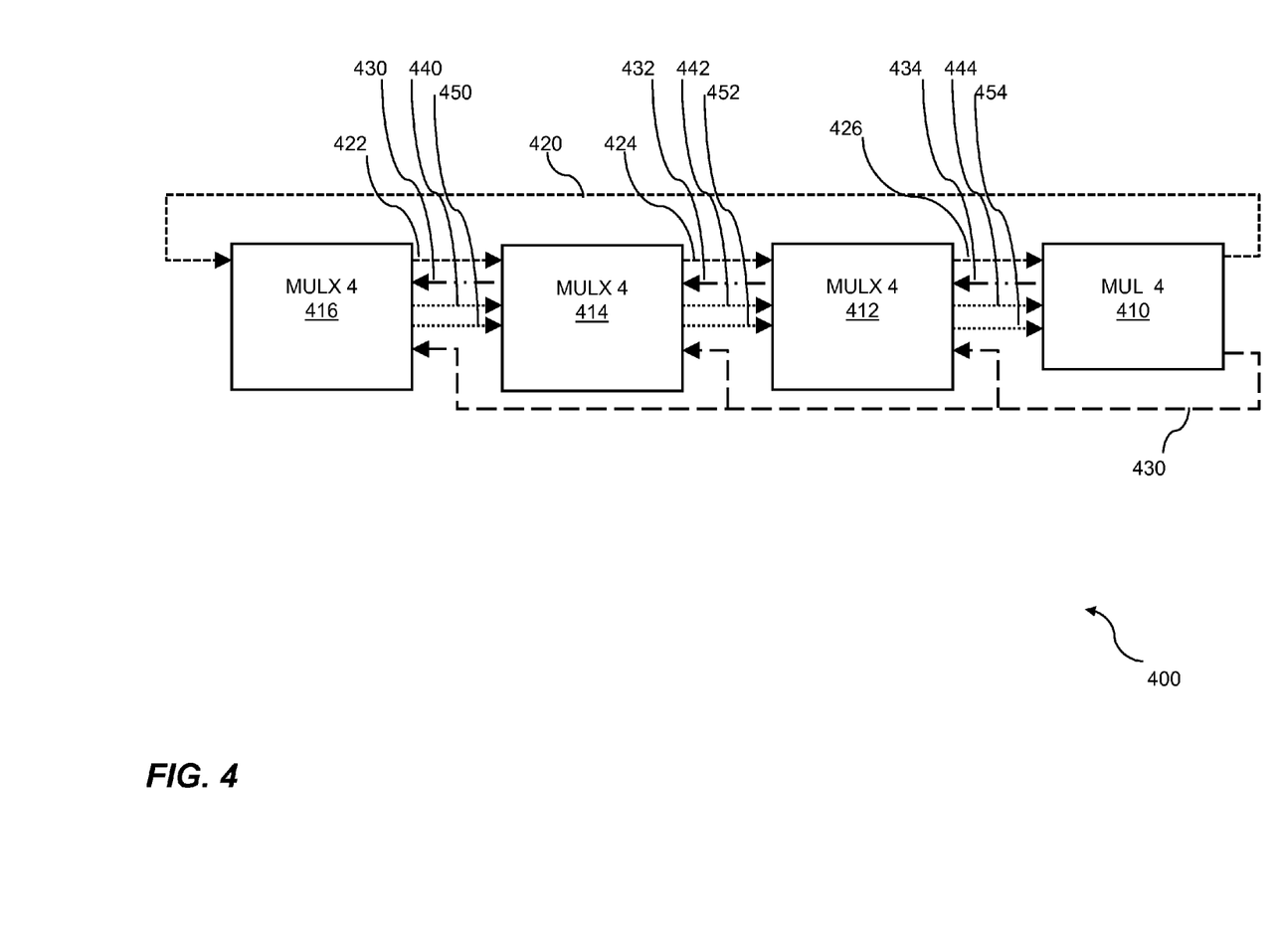
FIG. 4 is a block diagram showing a cascaded structure of a 32-bit multiplier.

FIG. 4 is a block diagram showing a cascaded structure 400 of a 32-bit multiplier. The cascaded structure 400 comprises a first multiplier 410 which is configured in local mode. The first multiplier 410 can multiply two binary numbers of a first width. In embodiments, the first width is eight bits. The multiplication of the two binary numbers can be accomplished iteratively.

Three additional multipliers, a second multiplier 412, a third multiplier 414, and a fourth multiplier 416, are configured in extensible mode. In embodiments, one multiplier 412 is a second multiplier that can multiply two binary numbers of a second width. The second width may be eight bits. The structure 400 includes a connection between the first multiplier 410 and the second multiplier 412 that enables multiplication of two binary numbers of a third width. The third width can have a width that is a sum of the first width and the second width. The multiplication of the two binary numbers of the third width can be accomplished iteratively. The first multiplier and the second multiplier can include configuration logic comprising a partial product register of the third width. The first multiplier and the second multiplier may also include configuration logic comprising a carry-save adder having a width value of the third width plus two. Likewise each of the extensible multipliers may include a partial product register for similar configuration. The first width and the second width may be the same. The first width and the second width may each be eight bits. The third multiplier and the fourth multiplier, connected to the first multiplier and the second multiplier, may be used wherein the third multiplier and the fourth multiplier each multiply eight bits.

The multiplier 410, the second multiplier 412, the third multiplier 414, and the fourth multiplier 416 can each be similar to the multiplier 300 of FIG. 3. In the following description of the signal connections of the cascaded structure 400, reference is made to a signal in FIG. 4, and its corresponding detailed signal within the multiplier that is illustrated in FIG. 3. The structure 400 may include added configuration logic wherein the first multiplier 410, the second multiplier 412, the third multiplier 414, and the fourth multiplier 416 are configured to multiply two 32-bit binary numbers. The two 32-bit binary numbers may be multiplied in 16 iterations. The multiplication, accomplished iteratively, may involve cascading a Booth-encoded signal 430 from the first multiplier 410 to the second multiplier 412.

A signal 430 is a Booth encoding output configuration signal similar to the signal 380 in FIG. 3. This signal 430 is generated by the first—least significant—multiplier 410 operating in a local mode, with input provided to the second multiplier 412, the third multiplier 414, and the fourth multiplier 416, which are operating in an extensible mode.

Another signal 420 is the output of the 2-bit adder of the first multiplier 410; this signal 420 is similar to the signal 390 of FIG. 3. It is input to the fourth multiplier 416, which is operating in extensible mode, and is received using a signal such as the signal 388 from FIG. 3 of the fourth multiplier 416. A signal 422 is output from the fourth multiplier 416 (similar to signal 390 of FIG. 3) and input to the second multiplier 414 (similar to signal 388 of FIG. 3). A signal 430 is output from the high order bit of the multiplicand register of the third multiplier 414 (similar to signal 386 of FIG. 3) and input to the fourth multiplier 416 (similar to signal 392 of FIG. 3). A signal 440 comprising a sum signal output from the CSA of the fourth multiplier 416 (similar to signal 360L of FIG. 3) and input to the third multiplier 414 (similar to signal 384 of FIG. 3). A signal 450 is a carry signal output from the CSA of the fourth multiplier 416 (similar to signal 362L of FIG. 3) and input to the third multiplier 414 (similar to 382 of FIG. 3).

The third multiplier 414 is connected to the second multiplier 412 in a similar manner. A signal 424 is output from the third multiplier 414 (similar to signal 390 of FIG. 3) and input to the second multiplier 412 (similar to signal 388 of FIG. 3). A signal 432 is output from the second multiplier 412 (similar to signal 386 of FIG. 3) and input to the third multiplier 414 (similar to 392 of FIG. 3). A signal 442 is output from the third multiplexer 414 (similar to signal 360L of FIG. 3) and is input to the second multiplier 412 (similar to signal 384 of FIG. 3). A signal 452 is output from the third multiplier 414 (similar to signal 362L of FIG. 3) and is input to the second multiplier 412 (similar to signal 382 of FIG. 3).

The second multiplier 412 is connected to the first multiplier 410 in a similar manner. A signal 426 is output from the second multiplexer 412 (similar to signal 390 of FIG. 3) and input to the first multiplier 410 (similar to signal 388 of FIG. 3). A signal 434 is output from the first multiplier 410 (similar to signal 386 of FIG. 3) and input to the second multiplexer 412 (similar to signal 392 of FIG. 3). A signal 444 is output from the second multiplexer 412 (similar to signal 360L of FIG. 3) and is input to the first multiplier 410 (similar to signal 384 of FIG. 3). A signal 454 is output from the second multiplier 412 (similar to signal 362L of FIG. 3) and is input to the first multiplexer 410 (similar to signal 382 of FIG. 3). In the configuration shown in FIG. 4, the four eight-bit multipliers perform a 32-bit multiplication as compared with the 16 eight-bit multipliers that were typically required in prior systems. The multipliers 412, 414, and 416 are configured to operate in extensible mode. This configuration may be performed by sending an instruction to the multipliers. The instruction may take the form of an opcode coming from a CPU or a processing element. A MULX instruction may be sent to extensible multipliers while a MUL instruction may be sent to the least significant multiplier 410 so that it is configured to operate in local mode. The cascaded configuration shown in FIG. 4 effectively creates a 32-bit partial product register, a 34-bit CSA, and a 32-bit multiplier register. Only the least significant multiplier 410 performs Booth encoding, and makes the results of the Booth encoding available to the other multipliers (the second multiplier 412, the third multiplier 414, and the fourth multiplier 416) which are operating in extensible mode.

In some embodiments, the MUL and MULX instructions assume signed operands (multipliers and multiplicands). Some embodiments support unsigned operands. In these two different embodiments (using signed and unsigned operands), the most significant bytes of the multiplicand and multiplier are treated differently. The Booth encoder (see 330 of FIG. 3) of the least significant multiplier 410 is configured to treat the value of the multiplier operand as an unsigned value. Furthermore, the most significant byte of the multiplicand, which is processed at the most significant multiplier, i.e. the fourth multiplier 416, is configured with a MULUX instruction to handle the most significant byte of the unsigned multiplicand operand.

A further advantage of the extensible multiplier architecture depicted in FIG. 4 is that it is capable of performing multiply-add operations of the form (c+a*b) with no extra hardware. The partial product register (sum register) may be initialized to a value in order to accomplish such a multiply-accumulate operation. Normal multiplication starts by initializing the PPS register (320 of FIG. 3) and PPC register (322 of FIG. 3) to 0. If instead of initializing to zero, the partial product sum register 320 is initialized to the value of c, then the expression c+a*b is evaluated. The initialization of the PPS register is performed with the instruction MAC, which ensures that subsequent MUL/MULX instructions effectively perform a multiply-add function. An opcode may be used to configure the first multiplier and the second multiplier to enable multiplication of the two binary numbers of the third width. Examples of some instructions are shown in the following table:

| INSTRUCTION | DESCRIPTION |
| --- | --- |
| MUL | Perform a local multiplication operation |
| MULX B | Perform an extensible multiplication of B bytes (e.g. MULX 4 is a 32 bit multiplication, MULX 2 is a 16-bit multiplication) |
| MULU | Perform a local unsigned multiplication operation |
| MULUX B | Perform an extensible unsigned multiplication of B bytes |
| MAC | Initialize registers for a multiply-add operation |

Figure 5:
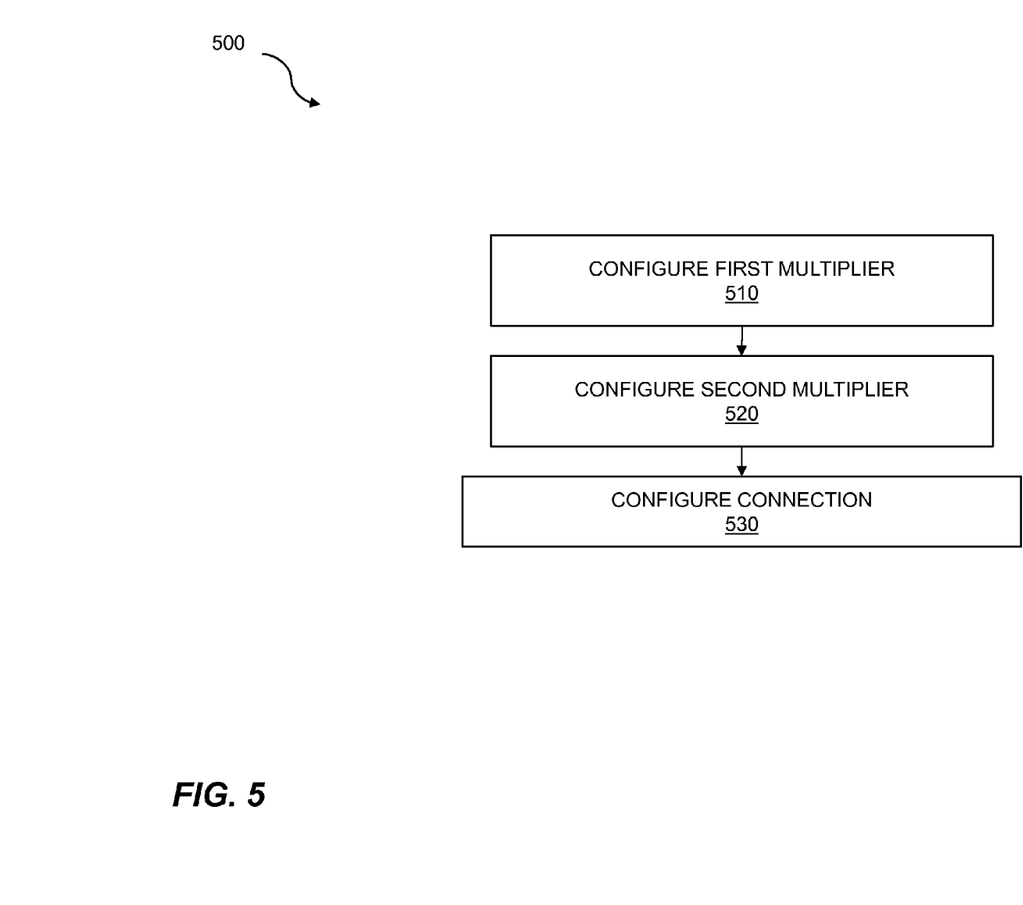
FIG. 5 is a flow diagram for configuring extensible multipliers.

FIG. 5 is a flow diagram 500 for configuring extensible multipliers. The flow 500 may comprise configuring a first multiplier 510 which can multiply two binary numbers of a first width and a second multiplier 520 which can multiply two binary numbers of a second width through a connection between the first multiplier and the second multiplier to enable multiplication of two binary numbers of a third width. The third width may have a width that is a sum of the first width and the second width. The multiplication of the two binary numbers of the third width may be accomplished iteratively.

The flow begins with configuring a first multiplier 510. This may comprise configuring a first multiplier in local mode (such as the multiplier 410 of FIG. 4). This may comprise selecting appropriate signal sources for various multiplexers (see FIG. 3 with signals 379, 381, etc.) within the first multiplier. The flow continues with configuring a second multiplier 520. This may comprise configuring a second multiplier in extensible mode (such as the second multiplier 412 of FIG. 4). This may comprise selecting appropriate signal sources for various multiplexers (see callouts in FIG. 3 such as multiplexer 379, multiplexer 381, etc.) within the second multiplier. The flow continues with configuring the connections 530 between the first multiplier and second multiplier. These connections may include routing signals such as signals 426, 434, 444, 454 and 430 of FIG. 4, among others. Various steps in the flow 500 may be changed in order, repeated, omitted, or the like without departing from the disclosed concepts.

Figure 6:
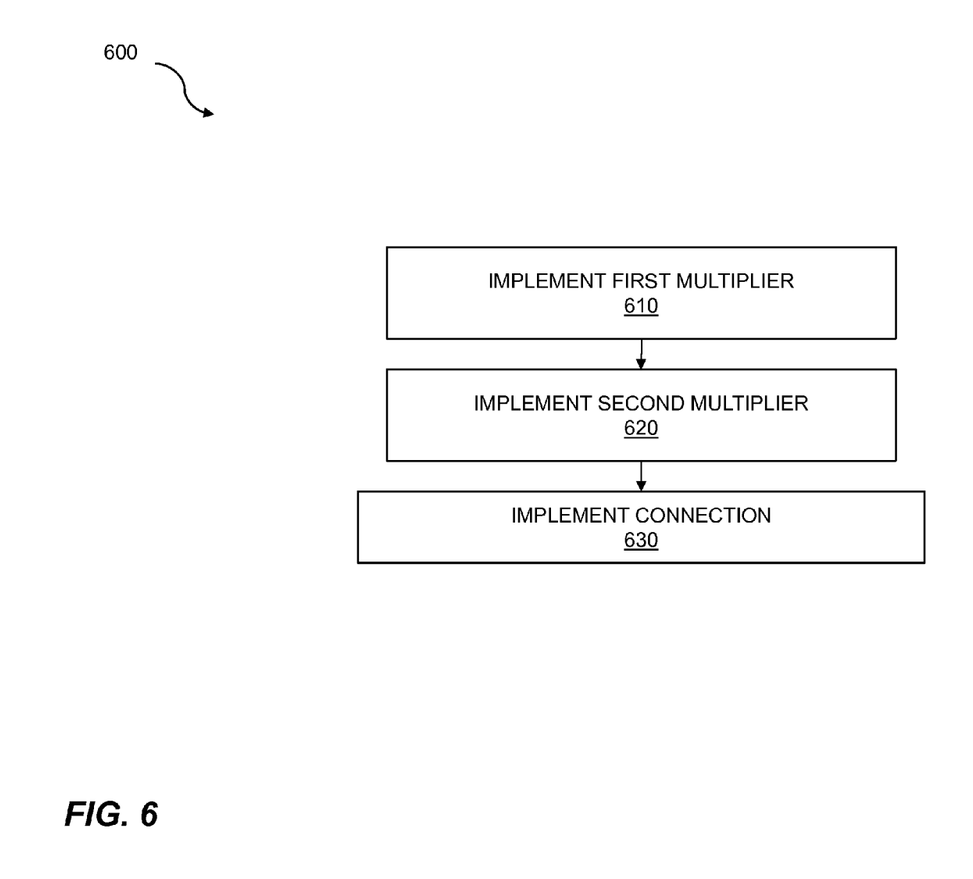
FIG. 6 is a flow diagram for implementing an extensible multiplier.

FIG. 6 is a flow diagram 600 for implementing an extensible multiplier. The flow may be part of a design automation environment where a semiconductor chip, or a portion thereof, is being designed. The flow 600 may include implementing a first multiplier 610 which can multiply two binary numbers of a first width. The flow 600 may include implementing a second multiplier 620 which can multiply two binary numbers of a second width. The flow 600 may include implementing a connection 630 between the first multiplier and the second multiplier that enables multiplication of two binary numbers of a third width. The third width may have a width that is a sum of the first width and the second width. The multiplication of the two binary numbers of the third width may be accomplished iteratively. Various steps in the flow 600 may be changed in order, repeated, omitted, or the like without departing from the disclosed concepts. Various embodiments of the flow 600 may be included in a computer program product embodied in a non-transitory computer readable medium that includes code executable by one or more processors.

Figure 7:
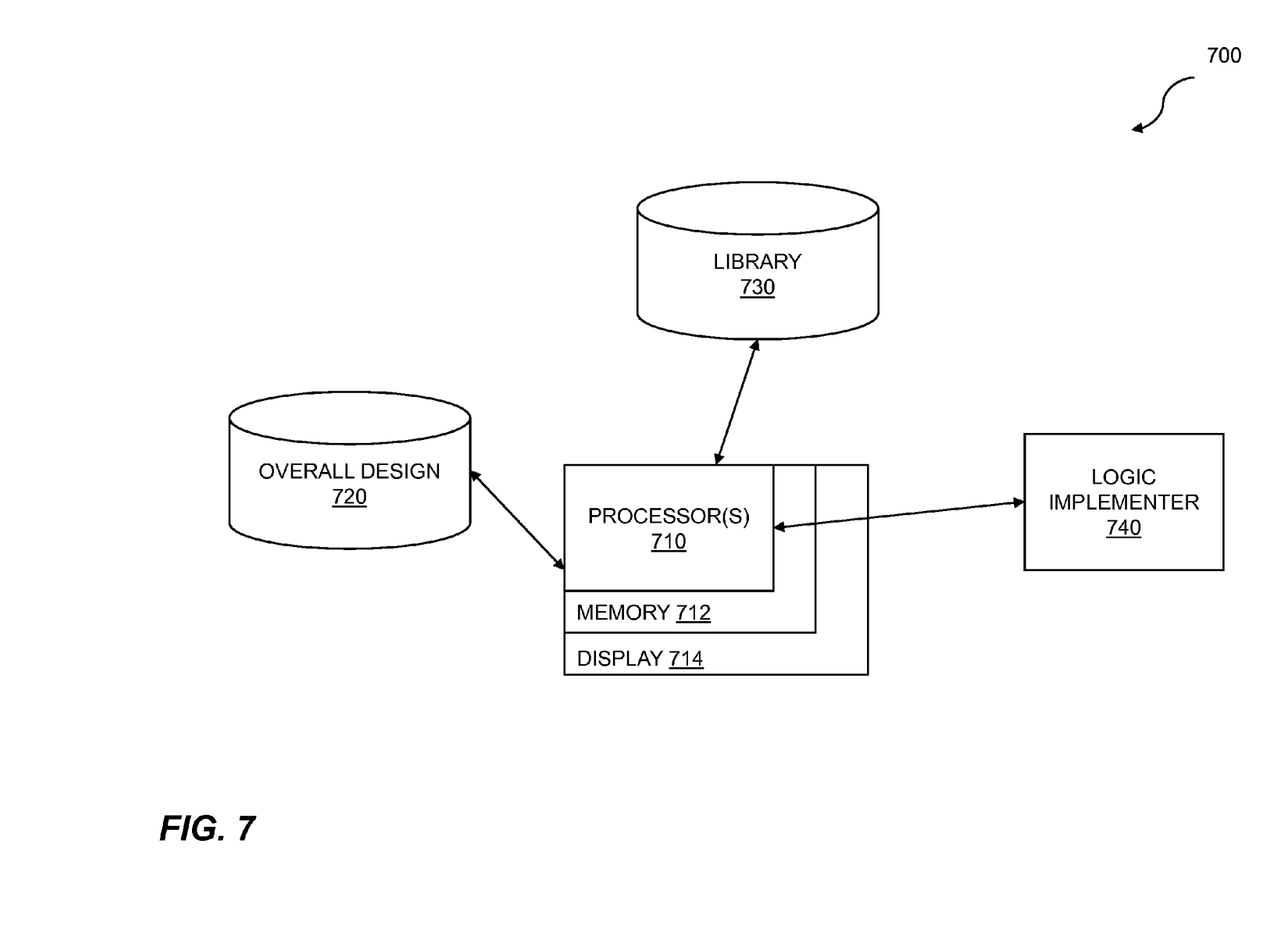
FIG. 7 is a diagram of a system for logic implementation.

FIG. 7 is a diagram of a system for logic implementation. The system for implementation of a logical calculation apparatus may comprise a memory 712 which stores instructions and one or more processors 710 coupled to the memory 712. The system 700 may include a display 714 and other human interface useful for providing direction to or receiving results from the system 700. The display 714 may be any electronic display, including but not limited to, a computer display, a laptop screen, a net-book screen, a tablet screen, a cell phone display, a mobile device display, a remote with a display, a television, a projector, or the like.

The processors 710 may import an overall design 720 and access a library 730 as well as a logic implementer 740. The logic implementer 740 may implement multipliers of varying widths and combine them in an extensible fashion. In at least one embodiment, the logic implementer function is performed by the one or more processors 710. The system 700 may include code for implementing a first multiplier which can multiply two binary numbers of a first width; code for implementing a second multiplier which can multiply two binary numbers of a second width; and code for implementing a connection between the first multiplier and the second multiplier that enables multiplication of two binary numbers of a third width where the third width has a width that is a sum of the first width and the second width. The multiplication of the two binary numbers of the third width may be accomplished iteratively.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. An apparatus for mathematical manipulation comprising:
   a first multiplier logic which can multiply two binary numbers of a first width;
   a second multiplier logic which can multiply two binary numbers of a second width; and
   a connection between the first multiplier logic and the second multiplier logic that enables multiplication of two binary numbers of a third width where the third width has a width that is a sum of the first width and the second width, wherein the multiplication of the two binary numbers of the third width is accomplished iteratively, and wherein an opcode is used to configure the first multiplier logic and the second multiplier logic to enable the multiplication of the two binary numbers of the third width.

2. The apparatus of claim 1 wherein the first multiplier and the second multiplier include configuration logic comprising a partial product register of the third width.

3. The apparatus of claim 2 wherein the partial product register is initialized to a value in order to accomplish a multiply-accumulate operation.

4. The apparatus of claim 1 wherein the first multiplier and the second multiplier include configuration logic comprising a carry-save adder having a width value of the third width plus two.

5. The apparatus of claim 1 wherein the first multiplier provides Booth encoding.

6. The apparatus of claim 1 wherein the first width and the second width are the same.

7. The apparatus of claim 6 wherein the first width and the second width are each eight bits.

8. The apparatus of claim 7 further comprising a third multiplier and a fourth multiplier connected to the first multiplier and the second multiplier, wherein the third multiplier and the fourth multiplier each multiply eight bits.

9. The apparatus of claim 8 further comprising added configuration logic wherein the first multiplier, the second multiplier, the third multiplier, and the fourth multiplier are configured to multiply two 32-bit binary numbers.

10. The apparatus of claim 9 wherein the two 32-bit binary numbers are multiplied in 16 iterations.

11. The apparatus of claim 8 wherein the multiplication by the first multiplier is by iteration and wherein the iteration includes four steps to accomplish eight-bit multiplication.

12. The apparatus of claim 11 wherein a 10-bit addend is generated and a carry-save addition is performed with a stored partial product.

13. The apparatus of claim 11 wherein eight upper bits from the multiplication are stored in carry-save form.

14. The apparatus of claim 1 wherein the multiplication, that is accomplished iteratively, involves cascading a Booth-encoded signal from the first multiplier to the second multiplier.

15. The apparatus of claim 1 further comprising a register for a multiplier number and register for a multiplicand number.

16. The apparatus of claim 15 wherein the register, for the multiplier number, is shifted to produce a Booth encoding.

17. A method of logical calculation comprising:
   configuring a first multiplier logic which can multiply two binary numbers of a first width and a second multiplier logic which can multiply two binary numbers of a second width through a connection between the first multiplier logic and the second multiplier logic to enable multiplication of two binary numbers of a third width where the third width has a width that is a sum of the first width and the second width, wherein the multiplication of the two binary numbers of the third width is accomplished iteratively, and wherein an opcode is used to configure the first multiplier logic and the second multiplier logic to enable the multiplication of the two binary numbers of the third width.

18. A computer implemented method for implementation of a logical calculation apparatus comprising:
   implementing a first multiplier logic which can multiply two binary numbers of a first width;
   implementing a second multiplier logic which can multiply two binary numbers of a second width; and
   implementing a connection between the first multiplier logic and the second multiplier logic that enables multiplication of two binary numbers of a third width where the third width has a width that is a sum of the first width and the second width, wherein the multiplication of the two binary numbers of the third width is accomplished iteratively, and wherein an opcode is used to configure the first multiplier logic and the second multiplier logic to enable the multiplication of the two binary numbers of the third width.

19. A computer program product embodied in a non-transitory computer readable medium for implementation of a logical calculation apparatus comprising code which causes one or more processors to perform operations of:

implementing a first multiplier logic which can multiply two binary numbers of a first width;

implementing a second multiplier logic which can multiply two binary numbers of a second width; and implementing a connection between the first multiplier logic and the second multiplier logic that enables multiplication of two binary numbers of a third width where the third width has a width that is a sum of the first width and the second width, wherein the multiplication of the two binary numbers of the third width is accomplished iteratively, and wherein an opcode is used to configure the first multiplier logic and the second multiplier logic to enable the multiplication of the two binary numbers of the third width.

20. A computer system for implementation of a logical calculation apparatus comprising:

a memory which stores instructions;

one or more processors coupled to the memory wherein the one or more processors are configured to:

implement a first multiplier logic which can multiply two binary numbers of a first width;

implement a second multiplier logic which can multiply two binary numbers of a second width; and implement a connection between the first multiplier logic and the second multiplier logic that enables multiplication of two binary numbers of a third width where the third width has a width that is a sum of the first width and the second width, wherein the multiplication of the two binary numbers of the third width is accomplished iteratively, and wherein an opcode is used to configure the first multiplier logic and the second multiplier logic to enable the multiplication of the two binary numbers of the third width.

* * * * *